(12) United States Patent
Dell

(10) Patent No.: US 7,712,010 B2
(45) Date of Patent: May 4, 2010

(54) SYSTEMS, METHODS AND COMPUTER PROGRAM PRODUCTS FOR UTILIZING A SPARE LANE FOR ADDITIONAL CHECKBITS

(75) Inventor: Timothy J. Dell, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 979 days.

(21) Appl. No.: 11/424,285

(22) Filed: Jun. 15, 2006

(65) Prior Publication Data
US 2008/0005644 A1     Jan. 3, 2008

(51) Int. Cl.
H03M 13/00     (2006.01)
(52) U.S. Cl. ............ 714/777; 714/758; 714/710; 370/227
(58) Field of Classification Search ............... 714/777, 714/758, 710; 370/227
See application file for complete search history.

(56) References Cited

U.S. PATENT DOCUMENTS

| | | |
|---|---|---|
| 5,132,967 A | 7/1992 | Kalajainen |
| 5,278,847 A | 1/1994 | Helbig, Sr. et al. |
| 5,784,391 A | 7/1998 | Konigsburg |
| 5,961,660 A | 10/1999 | Capps, Jr. et al. |
| 6,044,483 A | 3/2000 | Chen et al. |
| 6,675,341 B1 | 1/2004 | Chen et al. |
| 6,732,291 B1 | 5/2004 | Kilmer et al. |
| 7,299,313 B2 * | 11/2007 | Gower et al. ............... 711/100 |
| 2006/0212775 A1 * | 9/2006 | Cypher ...................... 714/758 |

FOREIGN PATENT DOCUMENTS

EP     0294287 A2     7/1988

* cited by examiner

Primary Examiner—M. Mujtaba K Chaudry
Assistant Examiner—Enam Ahmed
(74) Attorney, Agent, or Firm—Cantor Colburn LLP; John Campbell (57) ABSTRACT

Systems, method, and computer program products for utilizing a spare lane for additional checkbits. Systems include computer, storage or communications systems with bitlanes for transferring error correcting code (ECC) words in packets over a bus in multiple cycles, a spare bitlane available to the bus, a spared mode and an initial mode. The spared mode is executed when the spare bitlane has been deployed as a replacement bitlane for carrying data for one of the other bitlanes. The initial mode is executed when the spare bitlane has not been deployed as a replacement bitlane. The initial mode includes utilizing the spare bitlane for carrying one or more additional ECC checkbits. The initial mode provides at least one of a more robust error detecting function for the bus than the spared mode and a more robust error correcting function for the bus than the spared mode.

18 Claims, 6 Drawing Sheets

| bus xfer | ECC WORD BIT DEFINITION PER SYMBOL | | | | | | | | | | | | | | | |
|---|---|---|---|---|---|---|---|---|---|---|---|---|---|---|---|---|
| | S1 | S2 | S3 | S4 | S5 | S6 | S7 | S8 | S9 | S10 | S11 | S12 | S13 | S14 | S15 | S16 |
| TRANSFER 1 | 1 | 5 | 9 | 13 | 17 | 21 | 25 | 29 | 33 | 37 | 41 | 45 | C1 | C5 | C9 | C13 |
| TRANSFER 2 | 2 | 6 | 10 | 14 | 18 | 22 | 26 | 30 | 34 | 38 | 42 | 46 | C2 | C6 | C10 | C14 |
| TRANSFER 3 | 3 | 7 | 11 | 15 | 19 | 23 | 27 | 31 | 35 | 39 | 43 | 47 | C3 | C7 | C11 | C15 |
| TRANSFER 4 | 4 | 8 | 12 | 16 | 20 | 24 | 28 | 32 | 36 | 40 | 44 | 48 | C4 | C8 | C12 | C16 |

SYSTEMS, METHODS AND COMPUTER PROGRAM PRODUCTS FOR UTILIZING A SPARE LANE FOR ADDITIONAL CHECKBITS

TRADEMARKS

IBM® is a registered trademark of International Business Machines Corporation, Armonk, N.Y., U.S.A. Other names used herein may be registered trademarks, trademarks or product names of International Business Machines Corporation or other companies.

FIELD OF THE INVENTION

This invention relates to transferring data across computer, communications, or storage device buses, and particularly to protecting the data by means of an error correcting code (ECC) scheme.

BACKGROUND OF THE INVENTION

In the past, it was very common for computer systems to use wide parallel buses with many bits or bitlanes in a parallel configuration. These buses would deliver a dataword from a source to a receiver in one transfer. Thus, for example, a commonly used bus would deliver 64 databits to its destination every transfer cycle. Such a bus could be found both on-chip, on-module, and on-board. Also in the past, it was very common for communications systems to use a narrow, single wire bus with only one bitlane used per bus. These buses would deliver their dataword from a single source to a single (or multiple) receivers over many transfer cycles, i.e., one bit after another would be sent down the bitlane until the entire payload or dataword was delivered.

In order to insure that the data arrives safely at the receiver, error checking and/or error correcting on the bus is employed. In high-reliability computers, the parallel buses are typically protected with an ECC scheme. In high-reliability communications links, cyclical redundancy checking (CRC) is often employed. Generally speaking, ECC is usually used to provide "real-time" correction of a bad databit(s), and CRC is usually used to provide "real-time" detection of a bad databit(s). In an ECC scheme, the data is manipulated by the logic of the ECC to adjust the data received by the receiver such that "good" data is passed along downstream. In the CRC scheme, the data source is required to resend the bad dataword when signaled by the CRC that bad data was received. In such systems, ECC tends to be more effective when the nature of the errors is permanent (e.g., hard errors), and CRC tends to be more effective when the nature of the errors is transient (e.g., soft errors).

In future electronic systems, the traditional boundaries between computers and communication systems is blurring. Data is often transferred along a parallel, high-speed bus over several transfer cycles. This scheme provides very high bandwidth, but it also makes it necessary to deal with both hard and soft errors. Hard errors occur when the physical medium experiences a fault, such as a burned-out driver. Soft errors occur when a bit along a single bitlane is flipped due to conditions such as noise, skew and/or jitter.

The industry is moving in the direction of using CRC across the multiple bitlanes of a high-speed, parallel bus that signals for a retry whenever an error is present. These schemes have strong error detection, which is effective for soft errors, but they cannot correct an error, which makes them less useful for hard errors. In systems where hard error protection is necessary, an extension to the CRC has been proposed which includes a spare bitlane in the bus such that when a hard error is encountered, the bus will re-configure itself to replace the failing bitlane with the presumably-good spare bitlane.

Another alternative for providing protection for both hard and soft errors is a symbol-protecting bus ECC structure, where the symbols are defined along the bitlanes, rather than the traditional, across-word structure. This may be utilized when the ECC word is received in multiple packets. The ECC word includes data bits and ECC bits arranged into multi-bit ECC symbols, where each of the ECC symbols is associated with one of the bitlanes on the memory bus. The ECC symbols are then used to perform error detection and correction for the bits in the ECC word received via the bitlane and associated with the ECC symbol. This has been described in United States Patent Publication No. US20060107175A1, of common assignment herewith, filed Oct. 29, 2004, entitled: "System, Method and Storage Medium for Providing Fault Detection and Correction in a Memory Subsystem."

In data transmissions along communication channels or buses, noise in the channel cannot practically be eliminated. As a result, soft errors occur in the data being transmitted across the buses. In addition, systematic permanent faults, or hard errors, such as a break in a wire or a malfunction of a driver or receiver, also result in errors in the data being transmitted. A limitation of the extension to the CRC approach described above is that the system completely stops functioning while the system waits for a spare wire to be deployed. A limitation of the symbol-protecting bus ECC structure described above, when implemented with a bus that includes a dedicated spare wire, is that it is vulnerable to an all-too-common soft error while the system waits for a spare wire to be deployed. It would be desirable to be able to overcome both of these limitations by providing a system that continues to function and provide error correction and detection while waiting for a spare wire to be deployed. In addition, it would be desirable to have a fault-tolerant high-speed parallel bus that is resilient to both hard and soft errors.

BRIEF SUMMARY OF THE INVENTION

Embodiments include a computer, storage or communications system for utilizing a spare lane for additional checkbits. The system includes bitlanes for transferring error correcting code (ECC) words in packets over a bus in multiple cycles, a spare bitlane available to the bus, a spared mode and an initial mode. The spared mode is executed when the spare bitlane has been deployed as a replacement bitlane for carrying data for one of the other bitlanes. The initial mode is executed when the spare bitlane has not been deployed as a replacement bitlane. The initial mode includes utilizing the spare bitlane for carrying one or more additional ECC checkbits. The initial mode provides at least one of a more robust error detecting function for the bus than the spared mode and a more robust error correcting function for the bus than the spared mode.

Embodiments also include a method for providing error detection and correction on a bus. The method includes setting a computer, storage or communications system to a mode that utilizes a spare bitlane for carrying one or more additional ECC checkbits. Errors on the bus are detected and corrected. The errors are categorized as soft errors or hard errors. An alert is generated in response to detecting a hard error. Errors on the bus are continued to be detected and corrected after the alert is generated. The system is reset to a spared mode that does not utilize the spare bitlane in response to receiving a spare deploy command. The initial mode provides at least one of a more robust error detecting function for the bus than the spared mode and a more robust error correcting function for the bus than the spared mode.

Embodiments also include a computer program product for providing error detection and correction on a bus. The computer program product includes a storage medium readable by a processing circuit and storing instructions for execution by the processing circuit for facilitating a method. The method includes setting a computer, storage or communications system to a mode that utilizes a spare bitlane for carrying one or more additional ECC checkbits. Errors on the bus are detected and corrected. The errors are categorized as soft errors or hard errors. An alert is generated in response to detecting a hard error. Errors on the bus are continued to be detected and corrected after the alert is generated. The system is reset to a spared mode that does not utilize the spare bitlane in response to receiving a spare deploy command. The initial mode provides at least one of a more robust error detecting function for the bus than the spared mode and a more robust error correcting function for the bus than the spared mode.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary bus architecture includes twelve data wires, four error correcting code (ECC) wires and one spare wire that can be used for any wire fail. Each of these wires may be referred to logically as a bitlane. In a typically memory system, the spare wire, or spare bitlane, may be used to replace a failing wire between the memory controller and memory module, or between any two memory modules. In addition, the spare wire, or spare bitlane, may be utilized to replace a wire due to any number of hard failure modes, including, but not limited to: a wire failure, a connector failure, a solder interconnect failure, a driver failure and/or a receiver failure. Soft, or transient errors (e.g., due to factors such as noise and/or jitter) are generally more random and are corrected by the ECC when they occur.

In exemplary embodiments, an extended Reed-Solomon (R-S) code is used to define a distance 4 code (d=4). As is commonly known in the art, the term "Hamming distance" refers to how powerfully an ECC can detect and/or correct errors. A d=3 code can correct all single errors. A d=4 code can correct all single errors while simultaneously detecting all double errors. A d=5 code can correct all double errors while simultaneously detecting all double errors. A d=6 code can correct all double errors while simultaneously detecting all triple errors. The concept is further understood to be applicable to symbol-oriented codes, where a symbol is a predefined group of bits in the code stream. Thus, a distance 4 symbol code can correct all single symbol errors while simultaneously detecting all double symbol errors, etc. In general, the terms single symbol correcting (SSC) and double symbol detecting (DSD) would be combined for a distance 4 code and it would be designated, SSC/DSD, and similarly for a distance 4 binary code, the terms single error correcting (SEC) and double error detecting (DED) would be combined and thus the code would be referred to as a SEC/DED code.

Exemplary embodiments utilize a spare wire for additional error protection until a hard failure occurs that requires the use of the spare wire for correction. The use of the spare wire is possible because the spare wire is, by definition, not needed for base bus functionality until a hard failure occurs. This allows for a higher level of error detection and correction (e.g., from a d=4 code to a d=5 code) in the system while the spare wire is not being used as a replacement bitlane to correct a hard failure.

The system is particularly vulnerable to soft errors during the time that elapses between the occurrence of a hard fault and the deployment of a spare wire to correct the fault (i.e., the "spare-over time"). Exemplary embodiments protect the bus during the spare-over time continuing to use the spare bitlane during the spare-over time to perform error correction and detection. Once the spare has been deployed, the ECC is reduced to the level of error detection and correction that may be provided by the bitlanes reserved for ECC bits.

For example, in exemplary embodiments, if the extended ECC is a d=5 code during the initial mode when the system is using the spare bit lane as part of the ECC, the system is able to perform double error correction and double error detection. When a hard error occurs, the system can still detect and correct a soft error at the same time that it is detecting and correcting the hard error. Once the error is determined to be a hard error and the spare bit lane is deployed (system is in spared mode), the ECC has a distance code of d=4 and can perform double error detection and single error detection.

Exemplary embodiments utilize a symbol ECC interleaved in a fashion such that the symbol orientation is along the bitlanes. The narrow parallel interface delivers data in packets over several transfers. The ECC word is two-dimensional in that both the databits and the checkbits are transferred in multiple cycles over the high-speed parallel interface. For example, the ECC word may be actually formatted into groups of 64 bits: 48 databits and 16 checkbits. In this example, the word could be transferred over 4 transfer cycles, with each cycle contributing 16 bits.

In exemplary embodiments, when the ECC symbol is defined along the bitlanes any single wire failure will be correctable by the symbol correcting code. When a hard error occurs, it generally tales a combination of hardware logic and firmware microcode to determine when to deploy the spare. This is because it is easy to deploy the spare at the least sign of trouble, but it is also very wasteful to needlessly fix an intermittent problem with a permanent spare wire. To avoid needlessly deploying the spare wire, exemplary embodiments wait a finite amount of time to pass before the spare wire is deployed. During this time, the ECC may be at work on every single cycle to correct symbol errors along the failing bitlane. However, for double error detecting/single error correcting codes, while the ECC is employed correcting the bad symbol, any single, random soft failure on the bus will cause an uncorrectable error (UE). The nature of high-speed buses is that they are very prone to single, random soft bus failures, also known as bit error rate (BER). Therefore, in normal operation, a bus ECC that includes double error detection and single error correction is able to correct all of the random, single soft errors, but when a hard fail is taking place, these errors are catastrophic.

Exemplary embodiments increase the protection coverage of the bus ECC during normal operations by using a spare bitlane to increase the level of error detection and/or correction, and prevent normal BER from causing a UE during the spare deployment process. Using the spare bitlane before it is deployed allows for a more robust error checking and correcting function to be provided for the bus.

Figure 1:
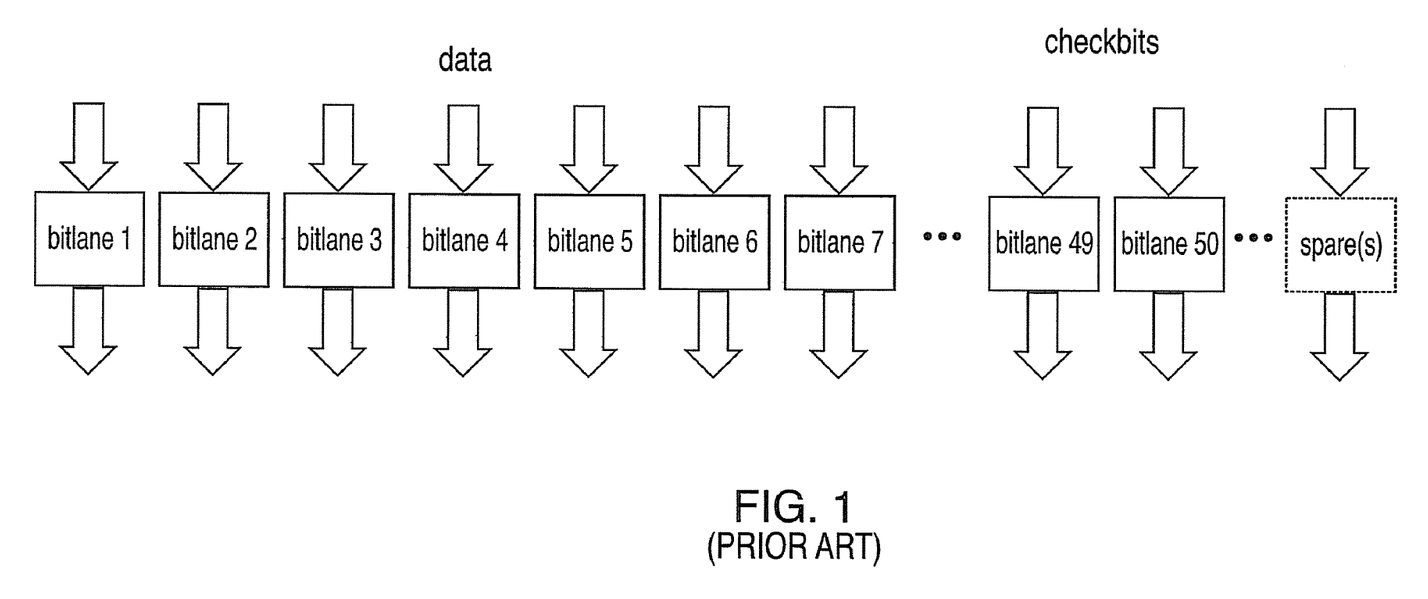
FIG. 1 depicts a typical parallel bus ECC structure.

FIG. 1 depicts a typical parallel bus ECC structure that is wide and transfers a complete ECC word in a single cycle. The ECC word is transferred entirely in one cycle, and a simple single error correction/double error detection (SEC/DED) code will correct any single bit failure anywhere in the ECC word, including a hard wire or bitlane failure. In the case of a hard error, every transfer will have the same bitlane bad, and the ECC will correct it on every transfer.

Figure 2:
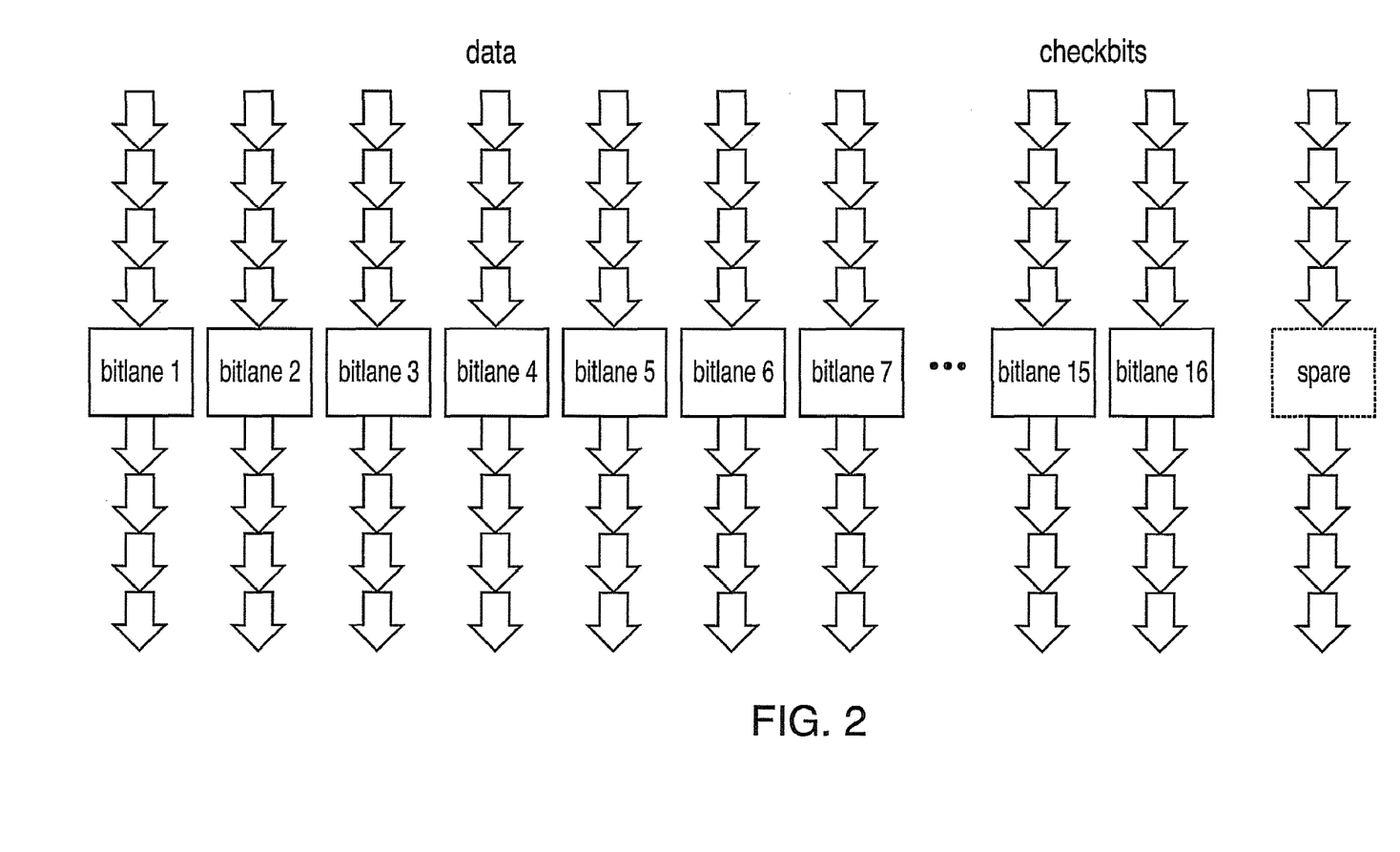
FIG. 2 depicts a hybrid serial/parallel bus ECC structure that may be utilized by exemplary embodiments.

FIG. 2 depicts a hybrid serial/parallel bus ECC structure that may be utilized by exemplary embodiments. In this structure, the ECC word is transferred over multiple cycles over a narrower bus (when compared to the bus depicted in FIG. 1). The ECC word is transferred over multiple cycles (in this example, four) such that a hard fail in any bitlane or wire will result in a multiple-bit error. Thus, the databits are protected along the bitlane dimension rather than the databit dimension. As compared to the bus depicted in FIG. 1, the bus in FIG. 2 has a reduced number of bitlanes (thus, what was done in a single transfer in FIG. 1 is now done in two or more transfers), with the speed of the data transfers typically increased to provide for equivalent or faster bus bandwidth. Buses of any number of wires (including unidirectional and bidirectional buses) may be utilized by exemplary embodiments.

Figure 3:
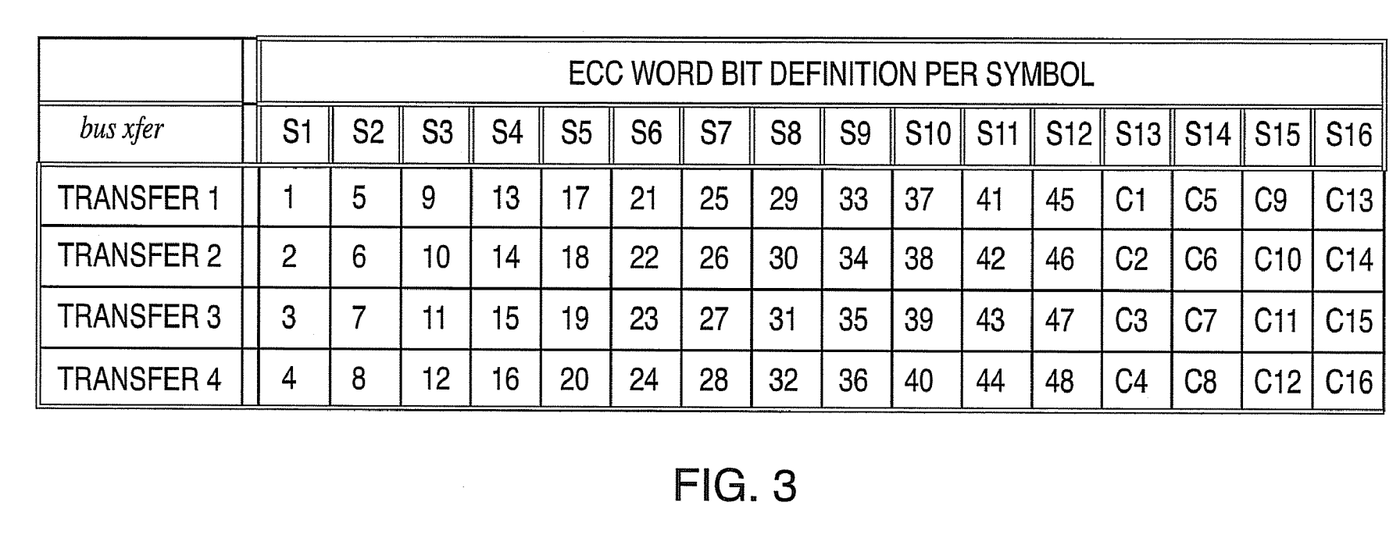
FIG. 3 depicts a translation table that may be utilized by the bus ECC structure depicted in FIG. 2.

FIG. 3 depicts an exemplary translation table from databits on bus wires over four transfers to bit positions of reconstituted ECC words that allow wire failures to align with code symbols. The translation table depicted in FIG. 3 may be utilized by exemplary embodiments. Bitlanes 1 through 12 include databits, and bitlanes 13 through 16 include checkbits. If bitlane 1 fails because of a hard error (e.g., the wire is broken), then the bits associated with symbol 1 (S1), bits 1, 2, 3 and 4, will be in error. In this case, a symbol ECC may be utilized to detect and correct the errors caused by the broken wire. The translation table depicted in FIG. 3 is intended to be exemplary in nature, and other translation tables may be utilized by exemplary embodiments.

In exemplary embodiments described herein, the symbol size is four to match the number of bus transfers that constitute the ECC word in exemplary embodiments. In this example, the code is designated as an S4EC/D4ED code, where the "4E" stands for "4-bit-symbol error." The starting point in exemplary embodiments is a d=4 code that is extended to a d=5 code by adding only one symbol using the spare bit lane.

With 4-bit symbols, an R-S code is a good choice. The R-S code is limited, however, to a total length of $2^m+1$ symbols, where m is the size of the symbol. Therefore, for m=4, the maximum code length is $2^4+1=17$ symbols, which times 4-bits per symbol is 68 total bits. Note that within the code length limitation, additional check symbols can be added to further increase the distance of these codes. In other words, a d=5 R-S code with 5 check symbols may be utilized for normal operation. When a soft error is encountered, the code will correct the error and continue on. When a hard error is encountered, the system will take note of the fact due to the consistent and persistent correction of a single bitlane. During this time, any soft error that occurs will also be corrected. After the system invokes the spare bitlane, it will immediately be taken out of the ECC scheme as the $5^{th}$ check symbol, and the ECC scheme will revert to a traditional d=4 SSC/DSD code. An exemplary embodiment of this process is depicted below in FIG. 4.

Figure 4:
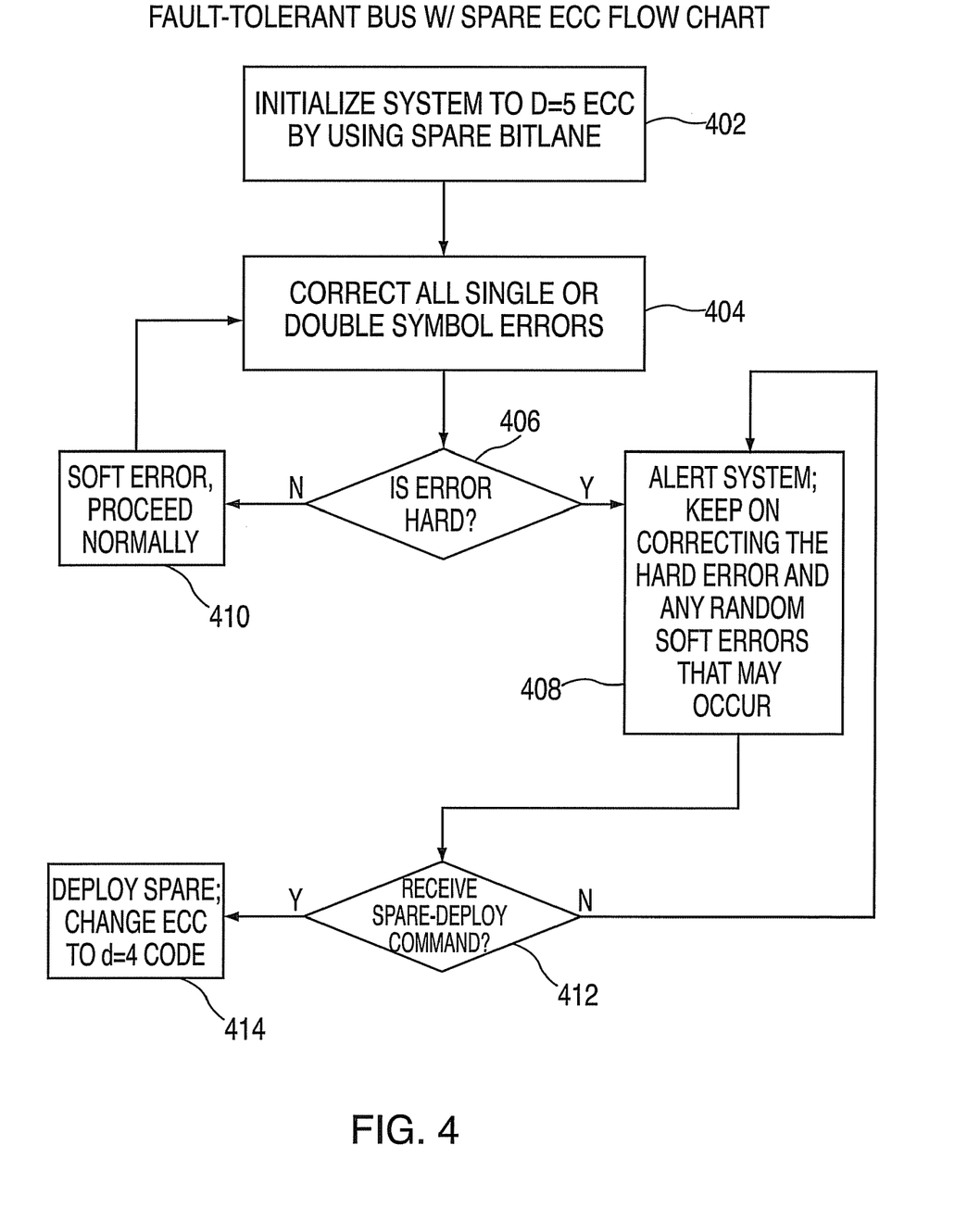
FIG. 4 depicts a process flow that may be implemented by exemplary embodiments for utilizing a spare bit as an extra ECC bit.

FIG. 4 depicts an exemplary process for utilizing a spare bit as an extra ECC bit when the spare wire associated with the spare bit is not being utilized to correct a hard error. At block 402, the system is initialized to a d=5 ECC by using a spare bitlane. An ECC with a d=5 code provides double error detecting and double error correcting. At block 404, the system executes in the initial mode and corrects all single or double symbol errors. At block 406, it is determined if a hard error has occurred. If a hard error has not occurred, as determined at block 406, then block 410 is performed and the error is assumed to be a soft error which is corrected at block 404.

If a hard error has occurred, as determined at block 406, then block 408 is performed. At block 408, the system is alerted while the hard error is continued to be corrected by the d=5 ECC. In addition, any random soft errors that may occur are also continued to be corrected by the d=5 ECC code. At block 412, it is determined if spare-deploy command has been received. If it has not been received, processing continues at block 408. It the spare-deploy command has been received, as determined at block 412, then block 414 is performed to deploy the spare wire and to change the ECC to a d=4 code. When the spare has been deployed as a replacement bitlane for carrying data for one of the other bitlanes, the system executes in a "spared mode" with a d=4 code that provides double error detection and single error correction.

It may further be advantageous to have a code structured such that the initial mode is a subset of the spared mode. This will save logic circuits and make timing the paths easier. In exemplary embodiments, the d=5 code has the H-matrix depicted in FIG. 5 which is in standard R-S form and includes a group of four rows for each check symbol: $a^i$ 502, $a^{2i}$ 504, $a^{3i}$ 506, and $a^{4i}$ 508.

Figure 5:
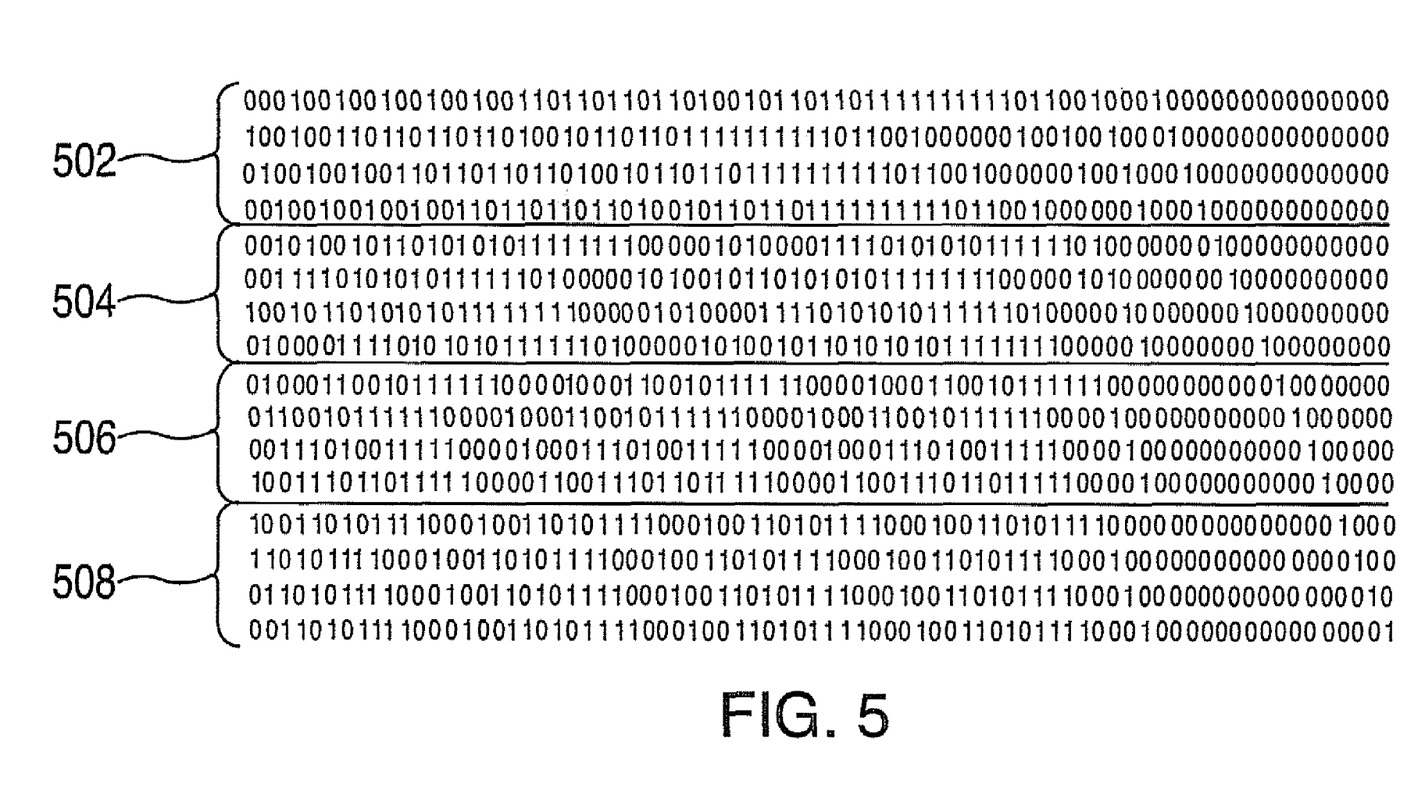
FIG. 5 depicts a H-matrix that may be utilized by exemplary embodiments when utilizing a spare bit as an extra ECC bit.
Figure 6:
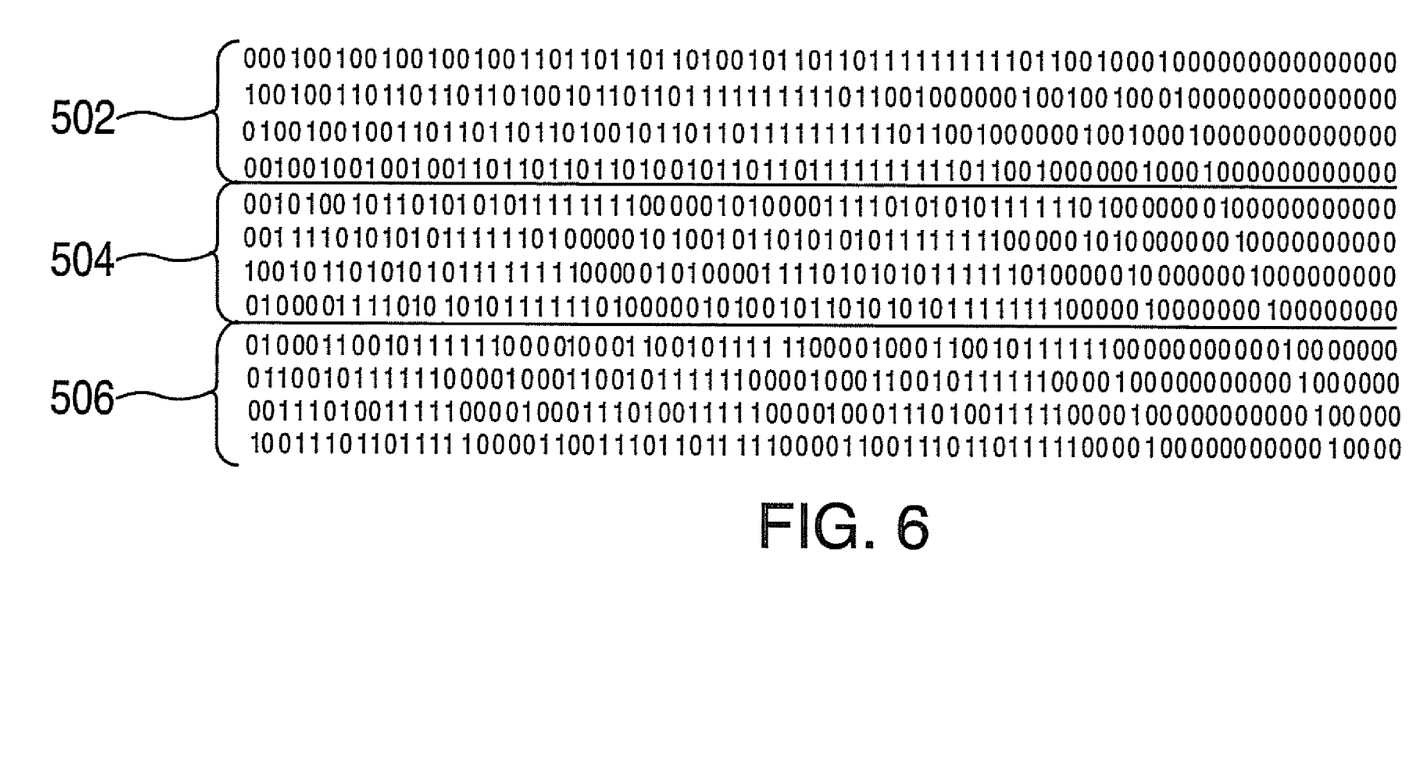
FIG. 6 depicts a H-matrix that may be utilized by exemplary embodiments when not utilizing a spare bit as an extra ECC bit.

Immediately after the spare is deployed as a replacement bitlane (e.g., in block 414 of FIG. 4), the ECC is adjusted to a d=4 code as shown in the H-matrix depicted in FIG. 6. FIG. 6 includes a subset of the rows in the H-matrix depicted in FIG. 5, resulting in a code construction of a lesser distance than that depicted in FIG. 6. Specifically, FIG. 6 includes rows for the first three check symbols: $a^i$ 502, $a^{2i}$ 504, and $a^{3i}$ 506.

FIGS. 5 and 6 depict example H-matrices in logical terms; a designer can utilize any actual hardware and/or software configuration as long as it obtains the same results as those depicted in FIGS. 4 and 5. These H-matrices are examples only as the size of the H-matrices will vary based on the number of wires on the bus and the type of error detecting and correcting being performed.

The examples described herein relate to a Hamming distances of four and five. As will be evident to those skilled in the art, other Hamming distances can be supported using the processing described herein.

The examples described herein relate to the use of single spare wire to increase the level of ECC in the system. As will be evident to those skilled in the art, additional spare wires may be utilized to further increase the level of ECC in the system.

The capabilities of the present invention can be implemented in software, firmware, hardware or some combination thereof.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

Technical effects and benefits of exemplary embodiments include the ability to detect and correct soft errors even after a hard error has been detected. This may lead to an increase in system availability. Exemplary embodiments provide the ability to detect and correct both hard errors and soft errors. The use of the spare wire for ECC allows for an increase in the level of ECC performed on the system before the spare wire has been deployed. This may lead to a more efficient use of system resources and to increased system availability at a relatively low cost.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A computer, storage, or communications system comprising:
    bitlanes for transferring error correcting code (ECC) words in packets over a bus in multiple cycles;
    a spare bitlane available to the bus;
    a spared mode for execution when the spare bitlane has been deployed as a replacement bitlane for carrying data for one of the other bitlanes; and
    an initial mode for execution when the spare bitlane has not been deployed as a replacement bitlane, the initial mode including utilizing the spare bitlane for carrying one or more additional ECC checkbits,
    wherein the initial mode provides at least one of a more robust error detecting function for the bus than the spared mode and a more robust error correcting function for the bus than the spared mode.

2. The system of claim 1 wherein the initial mode performs double error detection and double error correction.

3. The system of claim 1 wherein the spared mode performs double error detection and single error correction.

4. The system of claim 1 wherein the spared mode implements a Hamming distance code that is a subset of another Hamming distance code that is implemented by the initial mode.

5. The system of claim 4 wherein the spared mode implements a Hamming distance 4 code and the initial mode implements a Hamming distance 5 code.

6. The system of claim 1 wherein the initial mode continues to execute after a hard error is detected until the spare bitlane is deployed as a replacement bit lane.

7. A method for providing error detection and correction on a bus, the method comprising:
    setting a computer, storage, or communications system to an initial mode that utilizes a spare bitlane for carrying one or more additional ECC checkbits;
    detecting and correcting errors on the bus, the errors categorized as soft errors or hard errors;
    generating an alert in response to detecting a hard error;
    continuing to detect and correct errors on the bus after generating the alert; and
    resetting the system to a spared mode that does not utilize the spare bitlane in response to receiving a spare deploy command, wherein the initial mode provides at least one of a more robust error detecting function for the bus than the spared mode and a more robust error correcting function for the bus than the spared mode.

8. The method of claim 7 wherein the initial mode performs double error detection and double error correction.

9. The method of claim 7 wherein the spared mode performs double error detection and single error correction.

10. The method of claim 7 wherein the spared mode implements a Hamming distance code that is a subset of another Hamming distance code that is implemented by the initial mode.

11. The method of claim 10 wherein the spared mode implements a Hamming distance 4 code and the initial mode implements a Hamming distance 5 code.

12. The method of claim 7 wherein the system continues to operate in the initial mode after the hard error is detected until the spare bitlane is deployed as a replacement bit lane.

13. A computer readable storage medium for providing error detection and correction on a bus, the computer readable storage medium comprising:
    a storage medium readable by a processing circuit and storing instructions for execution by the processing circuit for facilitating a method, the method including:

setting a computer, storage, or communications system to an initial mode that utilizes a spare bitlane for carrying one or more additional ECC checkbits;

detecting and correcting errors on the bus, the errors categorized as soft errors or hard errors;

generating an alert in response to detecting a hard error;

continuing to detect and correct errors on the bus after generating the alert; and resetting the system to a spared mode that does not utilize the spare bitlane in response to receiving a spare deploy command, wherein the initial mode provides at least one of a more robust error detecting function for the bus than the spared mode and a more robust error correcting function for the bus than the spared mode.

14. The computer readable storage medium of claim 13 wherein the initial mode performs double error detection and double error correction.

15. The computer readable storage medium of claim 13 wherein the spared mode performs double error detection and single error correction.

16. The computer readable storage medium of claim 13 wherein the spared mode implements a Hamming distance code that is a subset of another Hamming distance code that is implemented by the initial mode.

17. The computer readable storage medium of claim 16 wherein the spared mode implements a Hamming distance 4 code and the initial mode implements a Hamming distance 5 code.

18. The computer readable storage medium of claim 13 wherein the system continues to operate in the initial mode after the hard error is detected until the spare bitlane is deployed as a replacement bitlane.

* * * * *